US008427430B2

(12) United States Patent
Lee et al.

(10) Patent No.: US 8,427,430 B2
(45) Date of Patent: Apr. 23, 2013

(54) APPARATUS FOR AND METHOD OF CONTROLLING DIGITAL IMAGE PROCESSING APPARATUS

(75) Inventors: Jong-hwan Lee, Seoul (KR); Seok-goun Lee, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 967 days.

(21) Appl. No.: 12/074,307

(22) Filed: Mar. 3, 2008

(65) Prior Publication Data

US 2009/0058791 A1    Mar. 5, 2009

(30) Foreign Application Priority Data

Aug. 30, 2007    (KR) .................. 10-2007-0087710

(51) Int. Cl.
*G09G 5/00* (2006.01)
*G09G 5/08* (2006.01)
(52) U.S. Cl.
USPC ........................... 345/169; 345/158; 345/211
(58) Field of Classification Search .................. 345/102, 345/158, 169, 211; 348/42, 51, 155
See application file for complete search history.

(56) References Cited

U.S. PATENT DOCUMENTS

| | | | | |
|---|---|---|---|---|
| 5,065,357 A | * | 11/1991 | Shiraishi et al. | 345/102 |
| 5,996,080 A | | 11/1999 | Silva et al. | |
| 6,259,472 B1 | * | 7/2001 | Park | 348/28 |
| 6,900,790 B1 | * | 5/2005 | Doi et al. | 345/156 |
| 6,956,564 B1 | * | 10/2005 | Williams | 345/179 |
| 2003/0085870 A1 | | 5/2003 | Hinckley | |
| 2007/0024581 A1 | | 2/2007 | Kim et al. | |
| 2007/0185644 A1 | | 8/2007 | Hirose | |
| 2008/0036729 A1 | * | 2/2008 | Mukuda | 345/102 |
| 2008/0046818 A1 | * | 2/2008 | Orgill et al. | 715/700 |
| 2008/0231714 A1 | * | 9/2008 | Estevez et al. | 348/208.16 |

FOREIGN PATENT DOCUMENTS

| | | |
|---|---|---|
| CN | 1193399 A | 9/1998 |
| JP | 2001-245182 A | 9/2001 |
| JP | 2004-201104 A | 7/2004 |
| JP | 2007-208406 A | 8/2007 |

OTHER PUBLICATIONS

Office Action established for GB 0804556.9 (Jun. 28, 2011).
Office Action established for CN 200810091584.2 (Aug. 3, 2011).

* cited by examiner

*Primary Examiner* — Kevin M Nguyen
*Assistant Examiner* — Sepideh Ghafari
(74) *Attorney, Agent, or Firm* — Drinker Biddle & Reath LLP (57) ABSTRACT

An apparatus for and method of controlling a digital image processing device in order to reduce power consumption by automatically recognizing a state in which power of a display device can be turned off or the display device can operate in a power saving mode, and in that case, turning off the display device or operating the display device in the power saving mode. The apparatus for controlling a digital image processing device includes: a motion sensing unit sensing a motion of the digital image processing device; and a control unit operating the digital image processing device in a power saving mode when it is determined that the digital image processing device moves.

15 Claims, 5 Drawing Sheets

APPARATUS FOR AND METHOD OF CONTROLLING DIGITAL IMAGE PROCESSING APPARATUS

CROSS-REFERENCE TO RELATED PATENT APPLICATIONS

This application claims the benefit of Korean Patent Application No. 10-2007-0087710, filed on Aug. 30, 2007, in the Korean Intellectual Property Office, the disclosure of which is incorporated herein in its entirety by reference.

BACKGROUND OF THE INVENTION

1. Field of the Invention

The present invention relates to a digital image processing device and method, and more particularly, to an apparatus for and method of controlling a digital image processing device by which an image is displayed on a display device so that a user can confirm an image being input and photograph the image displayed on the display device.

2. Description of the Related Art

In general, a digital image processing device may be a digital camera, a personal digital assistant (PDA), a phone camera, a PC camera, or other devices known in the art that use an image recognition sensor.

In the digital image processing device, an image input through an image pickup device can be displayed on an image display device which is operating as a viewfinder. Accordingly, a user can use the image display device to help the user capture a desired image and store it as an image file.

When the digital image processing device receives an image input through an image pickup device (i.e., a preview image or a pre-capture image), displays the input image on a display device, captures the image input through the image pickup device, and stores the image as an image file, the power consumption is large.

Also, if a battery with the same voltage is used when the power consumption required for the operations of the digital image processing device increases, the usage time of the battery decreases.

In particular, according to the recent trend of reducing the size of digital image processing devices, the size of a battery mounted installed in the digital image processing devices needs to be reduced. Accordingly, the power consumption of the digital image processing device using a battery with a limited capacity needs to be reduced.

In particular, because much power is consumed by a display device, it would be advantageous to reduce the power consumption of the display device.

SUMMARY OF THE INVENTION

The present invention provides an apparatus for and method of controlling a digital image processing device in order to reduce power consumption by automatically recognizing a state in which either the power of a display device can be turned off or the display device can operate in a power saving mode. When this state is recognized, the apparatus and method either turn off the display device or operate the display device in the power saving mode.

According to an aspect of the present invention, there is provided an apparatus for controlling a digital image processing device, the apparatus including: a motion sensing unit that senses a motion of the digital image processing device; and a control unit that operates the digital image processing device in a power saving mode when it is determined that the digital image processing device moves.

The apparatus may further include a display unit that operates in a power saving mode in which power consumption of the display unit is reduced.

The display unit may include a display panel on which an image is displayed, and a display panel driving unit that drives the display panel.

In one embodiment, the motion sensing unit may include a motion recognition sensor that senses the motion of the digital image processing device, and a motion recognition sensor control unit that controls the motion recognition sensor and generates a motion sensing signal when sensing the motion of the digital image processing device, and the control unit may receive the motion sensing signal and determine whether or not the digital image processing device moves.

The motion sensing unit may include a 3-axis motion sensing chip package mounted on a circuit board of the digital image processing device.

In another embodiment the motion sensing unit may be an algorithm executing on the control unit, the algorithm determining the difference between evaluation indexes of two continuous frames and determining if the difference is greater than a preset reference value. If the difference is greater than the preset reference value, the control unit may determine that the digital image processing device moves.

The evaluation index may be obtained from at least one of luminance data, red data, green data, and blue data calculated from each frame.

According to another aspect of the present invention, there is provided a method for controlling a digital image processing device, the method including: sensing a motion of the digital image processing device; and operating the digital image processing device in a power saving mode when it is determined that the digital image processing device moves.

In the power saving mode, either the power of the display unit may be turned off or the power of a backlight included in the display panel may be turned off.

The step of operating of the digital image processing device in the power saving mode may include the steps of: if motion of the digital image processing device is sensed, calculating the probability that the display panel included in the digital image processing device is being used by a user; and if it is determined that the display panel is not being used, operating the display panel in a mode in which the power consumption of the display panel is reduced.

The step of sensing of the motion of the digital image processing device may include: receiving an input image from the outside; dividing the input image into a plurality of areas; selecting at least some areas from among the plurality of areas, the selected areas defining patches; calculating image evaluation data of each patch; calculating the evaluation index of a current frame from the image evaluation data; and comparing the evaluation index of the current frame with the evaluation index of a previous frame.

According to the apparatus and method for controlling a digital image processing device of the present invention, in a predetermined state, the display device can be turned off or can be made to operate in a power saving mode so that power consumption of the digital image processing device can be reduced to extend battery usefulness.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
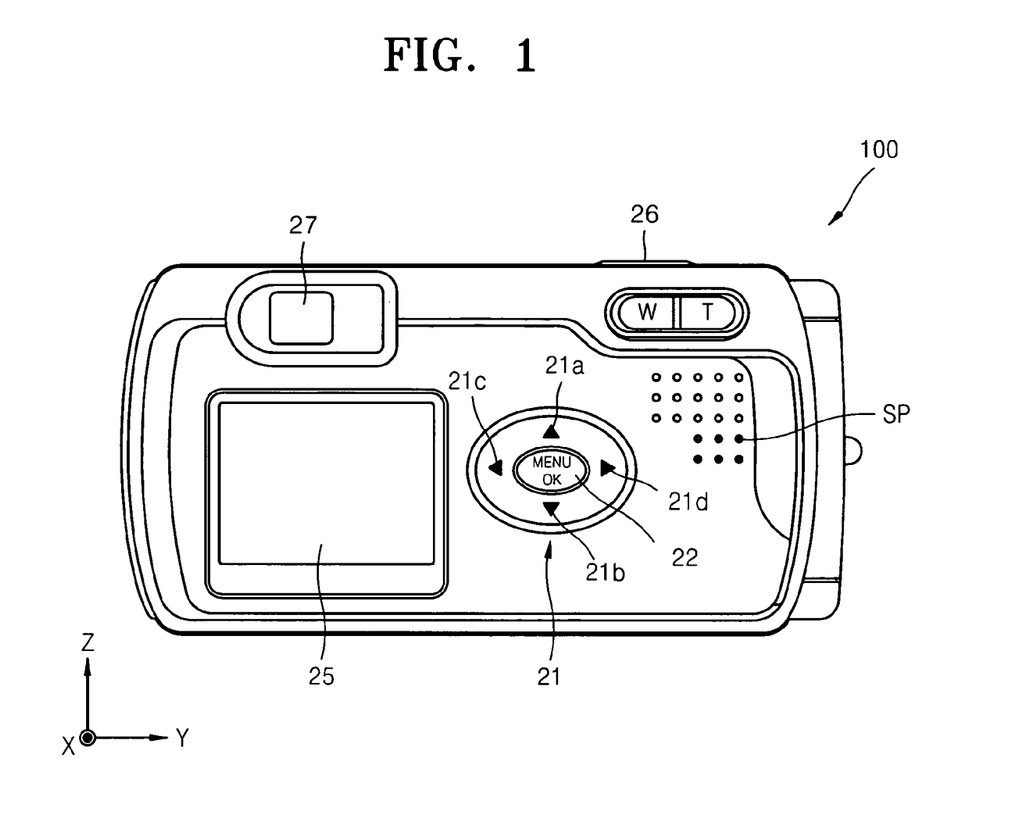
FIG. 1 is a diagram illustrating the external shape of the backside of a digital camera as an example of a digital image processing device according to an embodiment of the present invention.

FIG. 1 is a diagram illustrating the external shape of the backside of a digital camera 100 as an example of a digital image processing device using a controlling apparatus and method according to an embodiment of the present invention.

Referring to FIG. 1, a direction button 21, a menu-OK button 22, a wide angle-zoom button (W), a telephoto-zoom button (T), and a display panel 25 may be disposed on the backside of the digital camera 100.

In the direction button 21, a total of four buttons, namely an up button 21a, a down button 21b, a left button 21c, and a right button 21d can be included. The direction button 21 and the menu-OK button 22 are input keys for executing a variety of menu items for operations of the digital camera 100.

According to an input of the wide angle-zoom button (W) or the telephoto-zoom button (T), the view angle may increase or decrease. In particular, the buttons can be used in order to change the magnitude of a selected exposed area (e.g., an area to be photographed or a stored image being displayed/reproduced). In this case, if the signal of the wide angle-zoom button (W) is input, the magnitude of the selected exposed area may become small, and if the signal of the telephoto-zoom button (T) is input, the magnitude of the area may become big. As the display panel 25, an image display device such as a liquid crystal display (LCD) can be used.

Furthermore, the digital camera 100 includes a shutter release button 26, a flash (not shown), a power switch (not shown) and a lens unit (not shown). The digital camera 100 may also include an object lens and an eyepiece of a viewfinder 27.

The shutter release button 26 opens and closes the shutter in order to expose an image pickup device such as a CCD or a film to light reflected from the user's subject of photographing for a predetermined time. Also, the shutter release button 26 appropriately exposes an object in conjunction with an aperture (not shown) so that an image can be recorded in the image pickup device.

The display panel 25 may be included in a display unit of a controlling apparatus for the digital image processing device of the present invention. The display panel 25 displays an image being input on the screen (i.e., a preview/pre-capture image) or an image stored in a memory or a memory card of the apparatus. The display panel 25 is one element that consumes a substantial amount of power in the digital camera 100.

Accordingly, the present invention provides a controlling apparatus and method by which a period of time between the instants when a user takes two consecutive photos that does not necessarily need the display panel 25 to be turned on, is automatically recognized, and during this period of time, the display panel 25 is made to operate in a power saving mode, thereby reducing power consumption.

For example, when the user takes a photo and moves to a next shooting place, it may be desirable that the digital camera 100 is turned on but that the display panel 25 is turned off. That is, during instances when the user is conveying the camera 100 between locations and the camera 100 is in a photographing mode, there is a good likelihood that the user is not using the display panel 25. Accordingly, the present apparatus and method provide for turning the panel 25 off or operating it in a power saving mode during such user-conveying situations.

In this case, the digital camera 100 may operate like in the power saving mode, such that the display panel 25 is turned off, or if the display panel 25 includes a backlight like an LCD, the backlight is turned off.

Figure 2:
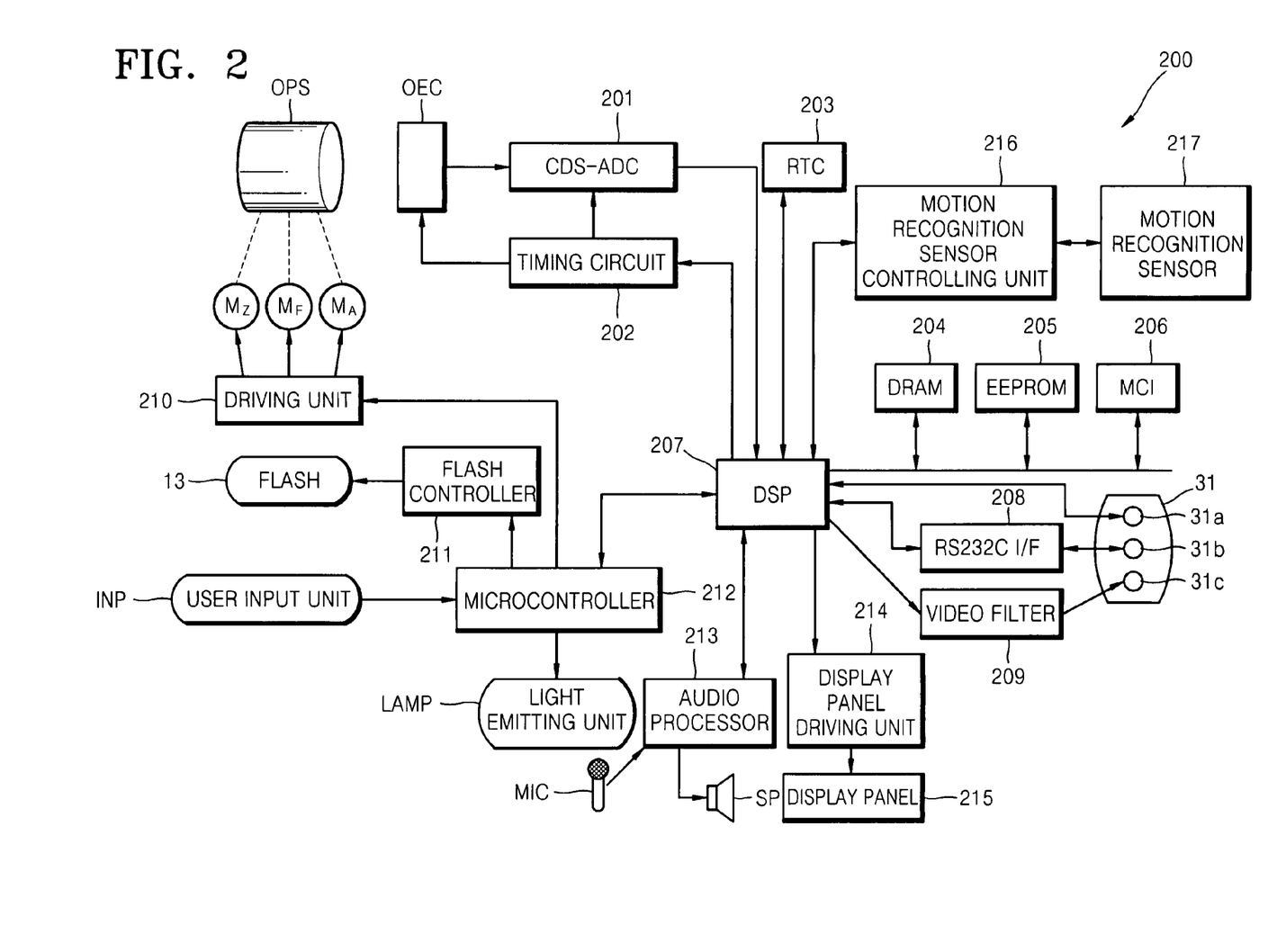
FIG. 2 is a schematic block diagram illustrating a control apparatus of a digital image processing device according to an embodiment of the present invention.

FIG. 2 is a schematic block diagram illustrating a control apparatus 200 of a digital image processing device according to an embodiment of the present invention. The control apparatus 200 may be configured inside the digital camera 100 illustrated in FIG. 1. In this case, the control apparatus 200 may include a printed circuit board (PCB) on which a plurality of circuit devices are mounted.

Referring to FIG. 2, an optical system (OPS) including a lens unit and a filter unit optically processes light from an object. The lens unit of the optical system (OPS) includes a zoom lens, a focus lens, and a compensation lens. If the user presses the wide angle-zoom button (W) or the telephoto-zoom button (T) included in the user input unit (INP), a corresponding signal is input to a microcontroller 212.

Accordingly, the microcontroller 212 controls a lens driving unit 210, thereby driving a zoom motor ($M_Z$) and moving the zoom lens. That is, if the wide angle-zoom button (W) is pressed, the focal length of the zoom lens becomes shorter, thereby widening the view angle, and if the telephoto-zoom button (T) is pressed, the focal length of the zoom lens becomes longer, thereby narrowing the view angle.

Meanwhile, in an auto focusing mode, a main controller included in a digital signal processor 207 controls the lens driving unit 210 through the microcontroller 212, thereby driving a focus motor ($M_F$). That is, by driving the focus motor ($M_F$), the focus lens is moved to a position where the clearest photo can be obtained.

A compensation lens compensates the refractive index, and therefore is not separately driven. Reference symbol $M_A$ indicates a motor for driving an aperture (not shown).

In a filter unit of the optical system (OPS), an optical low pass filter removes optical noise of a high frequency component. An infrared (IR) cut filter attenuates an infrared component of incident light.

A photoelectric conversion unit (OEC) may include an image pickup device such as a CCD or a complementary metal-oxide-semiconductor (CMOS) device. The photoelectric conversion unit (OEC) converts light from the optical system (OPS) into an analog electric signal.

An analog-digital conversion unit may include a correlation double sampler and analog-to-digital converter (CDS-ADC) device 201. The analog-digital conversion unit processes an analog signal from the photoelectric conversion unit (OEC) to remove high frequency noise and adjust the amplitude, and then, converts the signal into a digital signal. In this case, a digital signal processor 207 controls a timing circuit 202, thereby controlling operations of the photoelectric conversion unit (OEC) and the analog-digital conversion unit 201.

A real-time clock 202 provides time information to the digital signal processor 207. The digital signal processor 207 processes a digital signal from the CDS-ADC device 201, thereby generating a digital image signal defined by a luminance (Y value) and chromaticity (R, G, B) values.

A light emitting unit (LAMP) driven by the microcontroller 212 according to control of the main controller included in the digital signal processor 207 may include a self-timer lamp, an auto-focusing lamp, a mode indication lamp and a flash wait lamp. The user input unit (INP) may include the direction button 21, the wide angle-zoom button (W) and the telephoto-zoom button (T) shown in FIG. 1.

A digital image signal from the digital signal processor 207 is temporarily stored in a dynamic random access memory (DRAM) 204. Algorithms and setting data such as a booting program and a key input program required for the operation of the digital signal processor 207 are stored in an electrically erasable and programmable read only memory EEPROM 205. A memory card of the user may be attached to or detached from a memory card interface MCI 206.

A digital image signal from the digital signal processor 207 is input to a display panel driving unit 214 and as a result, an image is displayed on a display panel 215.

Meanwhile, a digital image signal from the digital signal processor 207 may be transmitted as a serial communication signal through a universal serial bus (USB) connection unit 31A or an RS232C interface 208 and its connection unit 31B, or may be transmitted as a video signal through a video filter 209 and a video output unit 31C.

An audio processor 213 outputs a voice signal picked up by a microphone (MIC) to the digital signal processor 207 or a speaker (SP). Furthermore, the audio processor 213 outputs a stored audio signal from the digital signal processor 207 to the speaker (SP).

The various elements of control apparatus 200 illustrated in FIG. 2 define an image input unit, a motion sensing unit, a display unit, and a control unit. The image input unit receives/captures and processes an input image from the outside. The motion sensing unit senses a motion of the digital image processing device.

The control unit operates the digital image processing device in a power saving mode if it is determined that the digital image processing device moves. The display unit (e.g., display panel driving unit 214 and display panel 215) displays an image and in the power saving mode the display unit operates in a reduced power consumption mode.

The image input unit may include, for example, the optical system (OPS), the photoelectric conversion unit (OEC), and the CDS-ADC device 201. The control unit may include the digital signal processor 207 and/or the microcontroller 212.

The control apparatus 200 senses motion of the digital image processing device, and if it is determined that the digital image processing device is moving, the control apparatus 200 operates so that the digital image processing apparatus can operate in a power saving mode. In particular, if the digital image processing device is moving, and if it is determined that the display panel is not being used by the user, the control apparatus 200 can control the display panel 215 to operate in a power saving mode.

As mentioned previously, the display unit may have the display panel 215 and the display panel driving unit 214. An image is displayed on the display panel 215. The display panel driving unit 214 drives the display panel 215 according to a signal from the digital signal processor 207. In the power saving mode, the power of the display panel 215 may be turned off.

In some instances, the display panel 215 may be a display such as an LCD panel with a backlight. In this case, in the power saving mode, the power of the display panel 215 may be turned off entirely or the backlight may be turned off.

That is, when the digital image processing device is moving and it is determined that the user does not use the display panel 215, the power of the display panel 215 is turned off or the power of the backlight is turned off, thereby allowing the display panel 215 to operate in the power saving mode.

However, the operation of the power saving mode in the present invention is not limited to the described turning off the display panel 215 or a backlight thereof. Indeed, a variety of methods capable of reducing the power consumption in digital image processing device can be used.

In this case, if the digital image processing device is moving and, therefore, it is determined that the user does not use the display panel 215, only the display panel 215 may operate in the power saving mode, while other elements of the apparatus may normally operate. This is to allow the other elements to quickly respond to manipulation of the user so that the user can perform desired operations.

According to an embodiment of the present invention, the motion sensing unit may include a motion recognition sensor 217 and a motion recognition sensor control unit 216. The motion recognition sensor 217 is a sensor for sensing a motion of the digital image processing device. The motion recognition sensor control unit 216 controls the motion recognition sensor 217 and generates a motion sensing signal which is output to the digital signal processor 207.

The motion sensing signal is generated by the motion recognition sensor control unit 216 when the motion recognition sensor control unit 216 detects or discriminates a motion of the digital image processing device based on an output of the motion recognition sensor 217. In this case, the control unit of the apparatus receives the motion sensing signal and determines whether or not the digital image processing device is moving.

The motion sensing unit (e.g., elements 216 and 217 shown in FIG. 2) can be mounted in the form of a chip package on the circuit board inside the digital image processing device such as the digital camera 100 illustrated in FIG. 1. That is, the motion sensing unit may include a 3-axis motion sensing chip package (e.g., accelerometer, gyroscope, etc.) which is mounted on the circuit board included in the digital image processing device.

In this case, the motion recognition sensor control unit 216 may recognize the motion of the motion recognition sensor 217 in relation to the 3-axis directions (X, Y, Z) as illustrated in FIG. 1, thereby outputting the motion degree as a vector or component value. Accordingly, the digital signal processor 207 can read the output value of the motion sensing unit and easily determine an amount of motion that the digital image processing device is experiencing.

Figure 3:
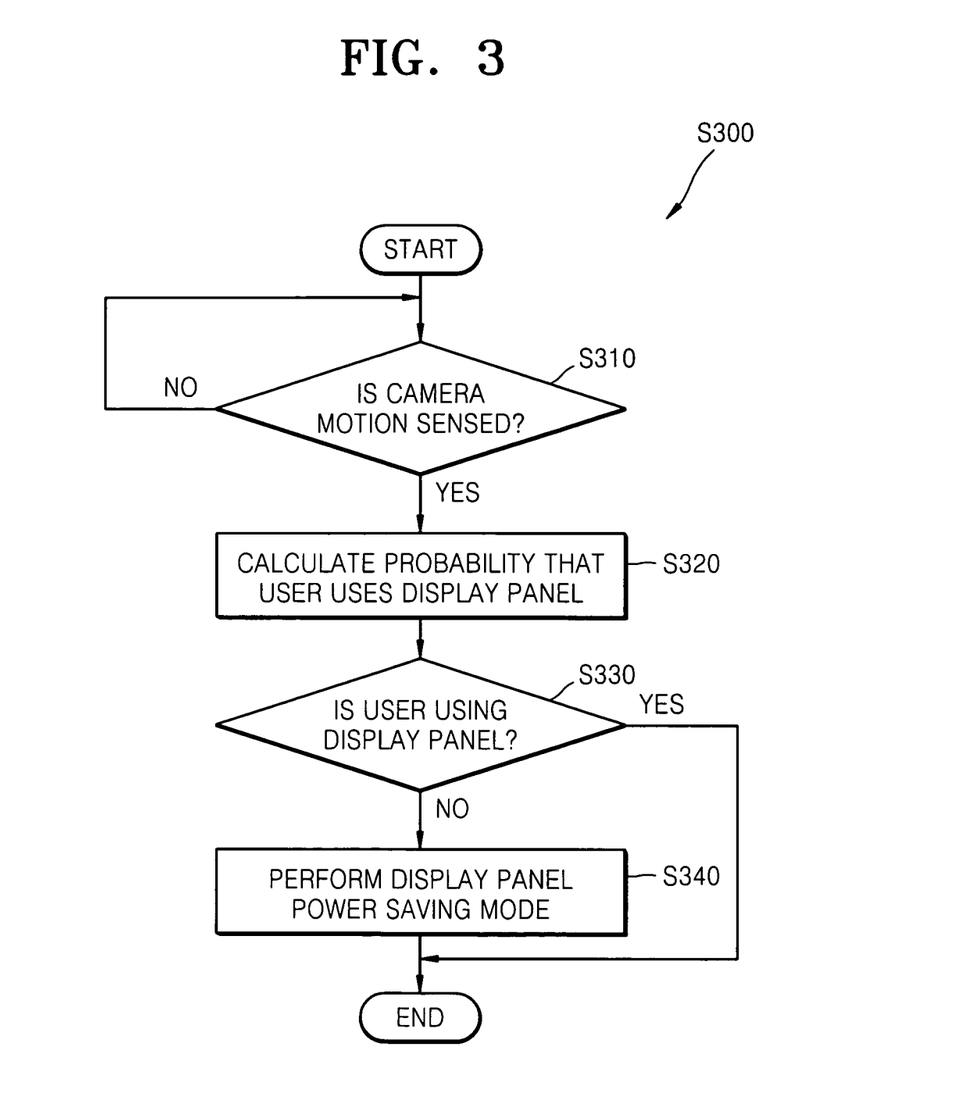
FIG. 3 is a schematic flowchart illustrating a method of controlling a digital image processing device according to an embodiment of the present invention.

The method of sensing the motion of the digital image processing device by using the motion recognition sensor 217 as described above can be implemented by a method of controlling a digital image processing device illustrated in FIG. 3.

In another embodiment of the present invention, the motion sensing unit may extract an evaluation index of an input image which is input through the image input unit, and sense the motion of the digital image processing device based on an amount of change in evaluation indexes between continuous frames. In this case, the motion sensing unit may be included in the control unit. That is, the motion sensing unit for sensing the motion of the digital image processing device may be implemented by an algorithm executing on the control unit.

Figure 5:
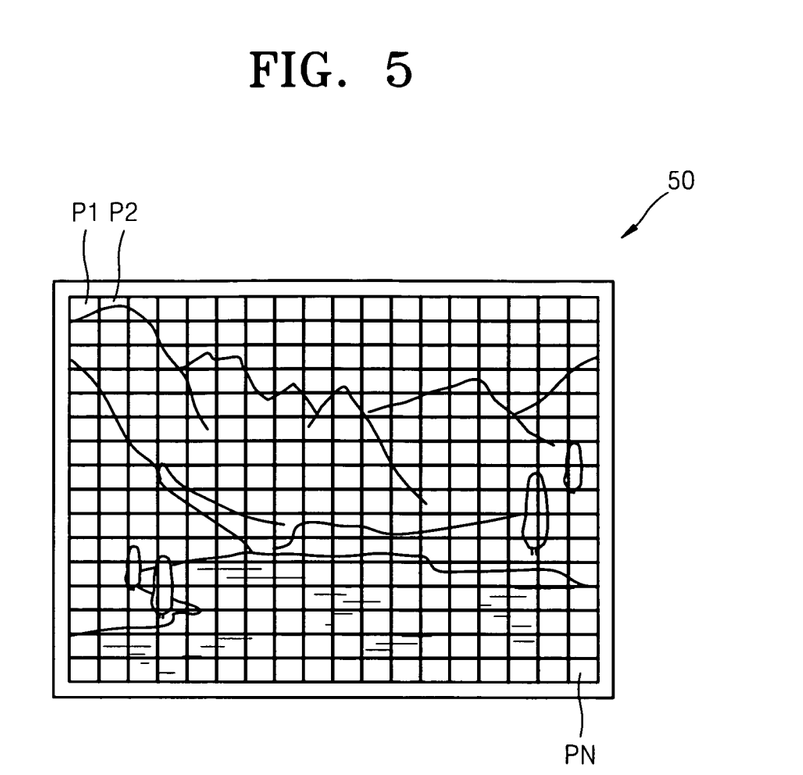
FIG. 5 is a schematic diagram illustrating a collection of patches extracted from an input image according to the method of controlling a digital image processing device illustrated in FIG. 4 according to an embodiment of the present invention.

In this case, if the difference between evaluation indexes of two continuous frames is greater than a preset reference value, it can be determined that the digital image processing device is moving. For the evaluation index, each frame image may be divided into a plurality of areas and at least a predetermined number of areas from among the plurality of areas are selected to define patches as illustrated in FIG. 5. Then, by obtaining image evaluation data of each of the patches, and the sum of the image evaluation data, the evaluation index can be obtained.

In this case, the evaluation index may be obtained from at least one of luminance data, red data, green data and blue data calculated from each frame. That is, image evaluation data is obtained from at least one of the luminance data, red data, green data, and blue data calculated in relation to each of the patches of a frame, and the evaluation index can be calculated by the sum of the image data of all patches in the frame.

In an embodiment of the present invention, the image of a frame may be divided into a plurality of areas and some of the areas are selected, the selected areas defining patches. Then, by obtaining luminance data of each of the patches, image evaluation data may be obtained. In this case, by adding the luminance data determined from each of the patches, the evaluation index of the frame can be obtained.

Also, if the difference between the evaluation indexes of a current frame and a previous frame is greater than a preset reference value, it can be determined that the digital image processing device has moved or is moving. In this case, if it is determined that the digital image processing device has moved or is moving, the display panel 215 may be operated in the power saving mode, by considering that the user is not photographing images while conveying the device from one location to another and, therefore, the display panel 215 is not being used by the user.

Accordingly, only when it is determined that the display panel 215 is being used by the user (e.g., if the device is set in an image reproduction/display mode), the display panel 215 is normally operated. Otherwise, when the display panel 215 is not being used, the device reduces power consumption by the display panel 215. Also, by doing so, the power consumed in the whole digital image processing device can be reduced, and the lifespan of batteries included in the digital image processing device can be extended.

Figure 4:
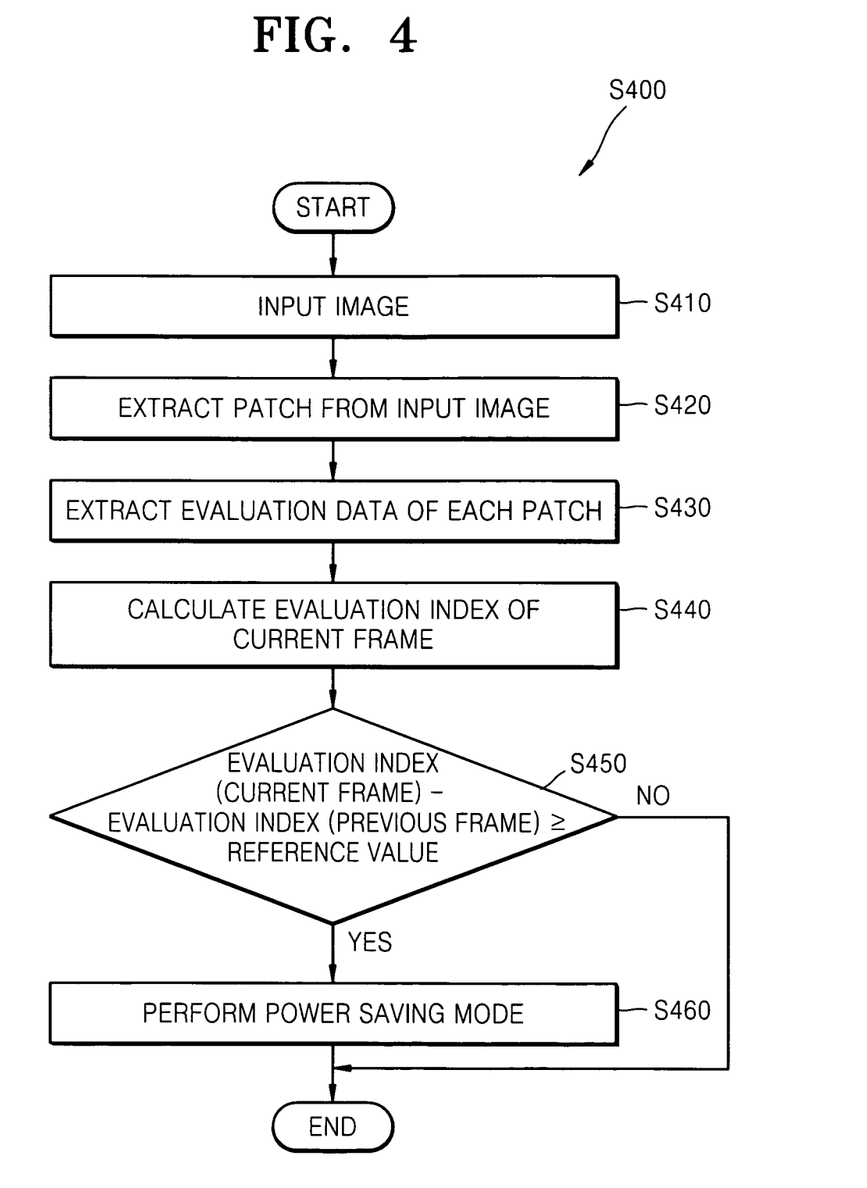
FIG. 4 is a schematic flowchart illustrating a method of controlling a digital image processing device according to another embodiment of the present invention.

The method of sensing the motion of the digital image processing device as described above can be implemented according to an example method of controlling a digital image processing device illustrated in FIG. 4.

FIG. 3 is a schematic flowchart illustrating one embodiment of a method (S300) of controlling a digital image processing device according to an aspect of the present invention. The example method (S300) can be used for controlling of the digital image processing device 100 illustrated in FIG. 1.

Referring to FIG. 3, the method (S300) includes: sensing a motion in operation S310, and causing the device to operate in a power saving mode in operations S320 through S340. In operation S310 the motion of the digital image processing device is sensed. In operations S320 through S340, if it is determined that the digital image processing device is moving, the digital image processing device is made to operate in the power saving mode.

In operation S310, the motion of the digital image processing device can be sensed by the motion recognition sensor 217 illustrated in FIG. 2. In this case, the digital image processing device may be the digital camera illustrated in FIG. 1, including the display panel 215. In operation S310, if the motion of the digital image processing device is sensed, operations S320 through S340 are then performed.

The power saving mode can be performed so that a display panel included in the digital image processing device operates in a mode for reducing power consumption. In this case, the power of the display panel may be turned off. Also, if a backlight is included in the display panel, the power of only the backlight, not the whole display panel, can be turned off.

However, the power saving mode operation in the present invention is not limited to the current embodiment and the digital image processing device can also be operated in a power saving mode according to other methods.

Operations S320 through S340 may include: calculating the probability of using the display panel in operation S320; and saving the power of the display panel in operations S330 and S340.

In the calculating of the probability of using the display panel in operation S320, the motion of the digital image processing device is sensed and the probability that the display panel included in the digital image processing device is being used by the user is calculated. In this case, if the motion of the digital image processing device is sensed by the motion recognition sensor 217 illustrated in FIG. 2, the motion of the digital image processing device can be measured as the amount of movement in relation to each of 3-axis directions (X, Y, Z).

In this case, the probability that the display panel is used by the user can be calculated from the distribution and magnitude of the amount of movement in relation to each of the 3-axis directions (X, Y, Z). The control unit may include a data structure (e.g., a look-up table, etc.) or algorithm that relates movement to probability that the display panel is being used by the user. Accordingly, the probability that the display panel is used by the user can be obtained. For example, if sensed movements of the device are great (e.g., a large magnitude vector) the control unit may determine device non-use, whereas if sensed movements of the device are minor (e.g., a small magnitude vector indicating handshake or vibration) the control unit may determine device use.

In operations S330 and S340, it is determined whether or not the user is using the display panel in operation S330, and if it is determined that the user is not using the display panel, the display panel is made to operate in a mode in which the power can be saved in operation S340. In this case, if the probability that the display panel is used by the user is greater than a preset reference probability, which may be experimentally determined and preset by the manufacturer and/or set or adjusted by the device through a learning process, it can be determined that the display panel is used by the user.

Accordingly, only when it is determined the display panel is used by the user, the display panel is made to normally operate, thereby saving the power consumed by the display panel. Also, by doing so, the power consumed in the whole digital image processing device can be reduced, and the lifespan of batteries included in the digital image processing device can be extended.

FIG. 4 is a schematic flowchart illustrating a method (S400) of controlling a digital image processing device according to another embodiment of the present invention. FIG. 5 is a schematic diagram illustrating a collection of patches extracted from an input image according to the method of controlling a digital image processing device illustrated in FIG. 4 according to an embodiment of the present invention.

Referring to FIG. 4, the method (S400) includes: sensing a motion of the digital image processing device in operations S410 through S450; and operating in a power saving mode in operation S460. In operations S410 through S450, the motion of the digital image processing device is sensed. In operation S450, if it is determined that the digital image processing device is moving, operation S460 causes the digital image processing device to operate in the power saving mode.

The method (S400) can be used for controlling of the digital image processing device 100 illustrated in FIG. 1.

In a digital image processing device having a live view (i.e., a viewfinder/image capture preview) function, patching of an input image is performed in order to set auto exposure and/or auto white balance. Accordingly, the patches can be usefully employed for other processes, including statistically collecting evaluation data of the input image for, for example, determining device movement.

In this case, the patching is performed by dividing an input image into a first predetermined number of areas, and reconstructing a second predetermined number of areas from the first predetermined of areas to define patches (P1 through PN) as illustrated in FIG. 5. Also, evaluation data of an input image can be obtained as the luminance (Y), and each color data of red (R), green (G), and blue (B) in relation to each of the patches (P1 through PN).

When the live view function is performed, evaluation data of patching and input image can be collected according to a predetermined timing such as a driving timing of an image pickup device. Accordingly, with a very short time interval, evaluation data of an input image in relation to each frame can be collected.

In operations S410 through S450 according to the current embodiment, the motion of the digital image processing device can be sensed by using the luminance and each color data of red (R), green (G), and blue (B) which are statistically collected in order to set auto exposure and/or auto white balance in the live view.

Operations S410 through S450 may include inputting an image in operation S410, performing patching in operation S420, extracting evaluation data in operation S430, calculating an evaluation index in operation S440, and comparing evaluation indexes in operation S450.

In inputting an image in operation S410, an input image is received from the outside. In performing patching in operation S420, the input image is divided into a plurality of areas, and at least some areas from among the plurality of areas are selected to define patches (P1 through PN), thereby reconstructing an input image.

In extracting evaluation data in operation S430, image evaluation data of each patch (P1 through PN) is calculated. In calculating an evaluation index in operation S440, the evaluation index of a current frame is calculated from the image evaluation data.

In comparing evaluation indexes in operation S450, the evaluation index of the current frame is compared with the evaluation index of a previous frame.

The input image which is input in operation S410 can be displayed on a display panel as a live view in units of frames. In performing patching in operation S420, an input image is reconstructed, thereby enabling an image 50 including a plurality of patches (P1 through PN) as illustrated in FIG. 5, to be formed.

TABLE 1

| Patch | Y | R | G | B |
|---|---|---|---|---|
| P1 | 693 | 812 | 664 | 544 |
| P2 | 717 | 840 | 687 | 564 |
| ... | ... | ... | ... | ... |
| PN | 431 | 267 | 465 | 698 |

In extracting evaluation data in operation S430, image evaluation data of each patch (P1 through PN) is calculated. The image evaluation data in relation to each patch (P1 through PN) can be obtained as luminance data (Y), red data (R), green data (G), and blue data (B) as illustrated in table 1.

The evaluation index which is calculated in operation S440 can be obtained by adding the image data for each frame. For example, an evaluation index for the current frame can be obtained from the sum of the luminance data (Y) of each patch (P1 through PN) of the current frame.

In comparing evaluation indexes in operation S450, by comparing the difference between the evaluation index of the current frame and the evaluation index of a previous frame, with a preset reference value, it can be determined whether or not the digital image processing device has moved. In this case, if the difference between the evaluation index of the current frame and the evaluation index of the previous frame is greater than the preset reference value, it can be determined that the digital image processing device has moved. That is, when it is determined that the digital image processing device has moved, it can be determined that the display panel is not used by the user.

In this case, the reference value which is compared with the difference between the evaluation index of the current frame and the evaluation index of the previous frame can be experimentally determined and preset by the manufacturer and/or set or adjusted by the device through a learning process.

If the motion of the digital image processing device is sensed in operations S410 through S450, an operation S460 for operating in a power saving mode can be performed.

The power saving mode can be operated as a mode in which the power consumption of the display panel included in the digital image processing device can be reduced. In this case, the power of the display panel may be turned off. Also, if a backlight is included in the display panel, the power of only the backlight may be turned off or reduced (i.e., dimming the backlight) instead of turning off the whole display panel.

When the user holds firmly the digital image processing device and wants to take a photo, a change in an input image is small and therefore a change in the evaluation indexes in continuous frames is small as a whole. However, when the user moves his hands while holding the digital image processing device, a change in an input image is big and therefore a change in the evaluation indexes in continuous frames can be very big.

That is, when a change in the luminance of an image being input to the digital camera is equal to or greater than a predetermined level, it can be determined that the motion of the digital camera is big.

Accordingly, when a change in the evaluation indexes in continuous frames is equal to or greater than a reference value, it can be determined that the user does not use the display panel. Accordingly, in that case, the display panel is made to operate in the power saving mode, thereby allowing power consumption to be reduced.

In this case, since power consumption is reduced, a smaller battery can be used, and if an identical battery is used, the lifespan of the battery can be extended.

Meanwhile, the power saving mode operation in the present invention is not limited to the power saving mode operation in the display panel, and the digital image processing device can be operated in a power saving mode according to other methods.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An apparatus for controlling a digital image processing device that includes an image input unit for receiving an image for photographing and a display unit for displaying the image, the apparatus comprising:
   a motion sensing unit in communication with the image input unit that determines whether the digital processing unit has moved or is moving by assessing whether the difference between an evaluation index of a current image frame and an evaluation index of a previous image frame is greater than a preset reference value and generates a motion sensing signal according to the determination; and
   a control unit in communication with the motion sensing unit for receiving the motion sensing signal, the control unit operating the digital image processing device in a power saving mode,
   wherein the display unit operates in a reduced power consumption mode when, according to the motion sensing signal, the control unit determines that the digital image processing device has moved or is moving.

2. The apparatus of claim 1, wherein the control unit causes power for the display unit to be turned off in the power saving mode.

3. The apparatus of claim 1, wherein the display unit includes a backlight, and wherein the control unit causes only power for the backlight to be turned off in the power saving mode.

4. The apparatus of claim 1, wherein the display unit comprises a display panel on which the image is displayed, and a display panel driving unit that drives the display panel according to at least a power reduction signal from the control unit.

5. The apparatus of claim 1, wherein the motion sensing unit comprises:
   a motion recognition sensor that senses the motion of the digital image processing device; and
   a motion recognition sensor control unit in communication with the motion recognition sensor and the control unit, the motion recognition sensor control unit controlling the motion recognition sensor and generating a motion sensing signal when sensing the motion of the digital image processing device, wherein the control unit receives the motion sensing signal and determines whether or not the digital image processing device moves.

6. The apparatus of claim 5, wherein the motion recognition sensor and the motion recognition sensor control unit are a 3-axis motion sensing chip package mounted on a circuit board of the digital image processing device.

7. The apparatus of claim 1, wherein when the difference between the evaluation indexes in two continuous image frames is greater than a preset reference value, the motion sensing unit determines that the digital image processing device moves.

8. The apparatus of claim 7, wherein in order to obtain the evaluation index, the apparatus performs the steps of:
   dividing an image of each frame into a plurality of areas;
   selecting at least some areas from among the plurality of areas to define patches;
   obtaining image evaluation data of each patch; and
   summing the image evaluation data.

9. The apparatus of claim 1, wherein the evaluation index is obtained based on at least one of luminance data, red data, green data, and blue data calculated from each image frame.

10. The apparatus of claim 1, wherein the motion sensing unit is included in the control unit.

11. A method for controlling a digital image processing device including an image input unit for receiving an image for photographing and a display unit for displaying the image, the method comprising:
   sensing a motion of the digital image processing device by extracting evaluation indexes of a current image frame and a previous image frame and assessing whether the difference between evaluation indexes of the current and previous image frames is greater than a preset reference value;
   generating a motion sensing signal if the difference is greater than the preset reference value; and
   operating the digital image processing device in a power saving mode wherein the display unit of the digital image processing device operates in a reduced power consumption mode when, according to the motion sensing signal, it is determined that the digital image processing device moved or is moving.

12. The method of claim 11, wherein the operating step further comprises:
   calculating a probability that a display panel of the digital image processing device is being used by a user; and
   according to the calculating step, if it is determined that the display panel is not being used, operating the display panel in a mode in which power consumption of the display panel is reduced.

13. The method of claim 11, wherein the step of calculating an evaluation index comprises summing image data from each of the patches.

14. The method of claim 11, wherein the comparing step comprises:
   determining a difference between the evaluation index of the current image frame and the evaluation index of the previous image frame; and
   determining if the difference is greater than a preset reference value, the preset reference value defining a movement threshold.

15. The method of claim 11, wherein the image evaluation data is at least one of luminance data, red data, green data, and blue data calculated from each image frame.

* * * * *